US012775633B2

(12) United States Patent
Yuan

(10) Patent No.: US 12,775,633 B2
(45) Date of Patent: Oct. 27, 2026

(54) REPLICA EXPANSION METHODS, APPARATUSES, AND SYSTEMS FOR DISTRIBUTED GRAPH DATABASE

(71) Applicant: Alipay (Hangzhou) Information Technology Co., Ltd., Hangzhou (CN)

(72) Inventor: Xiaohua Yuan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/943,228

(22) Filed: Nov. 11, 2024

(65) Prior Publication Data

US 2025/0190447 A1 Jun. 12, 2025

(30) Foreign Application Priority Data

Dec. 12, 2023 (CN) ......................... 202311704305.6

(51) Int. Cl.

| | |
|---|---|
| ***G06F 16/27*** | (2019.01) |
| ***G06F 16/21*** | (2019.01) |
| ***G06F 16/28*** | (2019.01) |
| ***G06F 16/901*** | (2019.01) |

(52) U.S. Cl.

CPC .......... *G06F 16/275* (2019.01); *G06F 16/214* (2019.01); *G06F 16/27* (2019.01); *G06F 16/273* (2019.01); *G06F 16/288* (2019.01); *G06F 16/9024* (2019.01)

(58) Field of Classification Search

CPC ...... G06F 16/214; G06F 16/27; G06F 16/273; G06F 16/275; G06F 16/9024; G06F 16/2282; G06F 9/5083; G06F 16/215; Y02D 10/00

See application file for complete search history.

(56) References Cited

U.S. PATENT DOCUMENTS

| | | | | |
|---|---|---|---|---|
| 11,544,251 | B1 * | 1/2023 | Lindaaker | G06F 16/27 |
| 2012/0239616 | A1 | 9/2012 | Cunningham et al. | |
| 2020/0044939 | A1 | 2/2020 | Xia | |
| 2022/0057519 | A1 * | 2/2022 | Goldstein | G01S 17/88 |
| 2023/0105249 | A1 * | 4/2023 | Mohamed | G06F 16/2228 |
| 2024/0346010 | A1 * | 10/2024 | Lu | G06F 16/27 |
| 2025/0036650 | A1 * | 1/2025 | Gao | G06F 9/54 |

FOREIGN PATENT DOCUMENTS

| | | | |
|---|---|---|---|
| CN | 109683826 | A | 4/2019 |
| CN | 109918386 | A | 6/2019 |
| WO | 2017097059 | A1 | 6/2017 |
| WO | 2022240906 | A1 | 11/2022 |

* cited by examiner

*Primary Examiner* — Marcin R Filipczyk
(74) *Attorney, Agent, or Firm* — Fish & Richardson P.C.

(57) ABSTRACT

A computer-implemented method for distributed graph database replica expansion and performed by a second data storage data node to be expanded includes, in response to reception of graph data migration information, entering a data copy-only mode and initiating graph data migration from a first data storage node to obtain a data snapshot of a first graph data shard. Following graph data migration, entering a data storage service mode and sending a graph data shard deletion notification to the first data storage node to delete the first graph data shard. In the data storage service mode, performing data synchronization with a corresponding first graph data shard of a primary replica based on a data point in the data snapshot. The first data storage node deletes a migrated graph data shard in response to the graph data shard deletion notification.

14 Claims, 7 Drawing Sheets

[root@iz2vc5ggtphtk3c0eay09oZ data]# ls geabase20_snapshot/2023-12-04-14\:03\:47/db0

REPLICA EXPANSION METHODS, APPARATUSES, AND SYSTEMS FOR DISTRIBUTED GRAPH DATABASE

CROSS-REFERENCE TO RELATED APPLICATIONS

This application claims priority to Chinese Patent Application No. 202311704305.6, filed on Dec. 12, 2023, which is hereby incorporated by reference in its entirety.

TECHNICAL FIELD

Embodiments of this specification generally relate to the field of graph databases, and in particular, to replica expansion methods, apparatuses, and systems for a distributed graph database.

BACKGROUND

A graph database is a database that stores data in a graph structure and is suitable for processing data in a complex relationship. In querying the data in a complex relationship, the graph database has higher performance and flexibility than a relational database. With the continuous development of graph computing technologies, the graph database is increasingly applied to various application scenarios, such as an Internet application scenario.

Graph data is composed of nodes (vertices) and edges, where the nodes represent entities and the edges represent relationships between the entities. For example, in social graph data, each person represents one node, and relationships (for example, friends, families, or colleagues) form edges. As increasingly more entities and relationships are involved in an application scenario, a scale of graph data becomes increasingly larger, and a single data storage node (for example, a server node) cannot provide an enough storage capacity to store complete graph data. Therefore, a distributed graph database is proposed.

The distributed graph database is a graph database that stores, manages, and processes graph data on a plurality of data storage nodes. Based on a distributed system theory, the distributed graph database segments graph data into a plurality of graph data shards, and the graph data shards are separately stored on different data storage nodes. Then, graph data shards are combined in a distributed computing manner to form complete graph data, so as to provide a graph data service.

As graph data is continuously generated, a stored graph data capacity becomes increasingly larger, and a storage capacity of a data storage node cluster allocated to a single replica is no longer enough to store the graph data, or a data storage capacity allocated to a single replica is insufficient due to performance degradation of a data storage node. In this case, data storage node expansion needs to be initiated for the replica, that is, a new data storage node is added to a data storage node cluster used to store the replica, and a part of graph data shards on an original data storage node in the data storage node cluster are migrated to the added new data storage node.

SUMMARY

Embodiments of this specification provide replica expansion methods, apparatuses, and systems for a distributed graph database. In this replica expansion scheme, for a data storage node to be expanded, during graph data shard migration, the data storage node is set to a data copy-only mode, so that in a graph data shard migration process, only data copy is performed but a read/write service is not provided to the outside; and in addition, after the graph data shard migration is completed, the data storage node is set to a data storage service mode, and data synchronization is performed with a corresponding graph data shard in a primary replica based on a data point recorded in a data snapshot generated during the graph data shard migration, thereby ensuring the integrity and the security of graph data on the data storage node to be expanded.

According to one aspect of the embodiments of this specification, a replica expansion method for a distributed graph database is provided. The replica expansion method is performed by a second data storage node to be expanded, and the replica expansion method includes the following: in response to reception of graph data migration information, entering a data copy-only mode and initiating, based on the graph data migration information, graph data migration from a first data storage node that stores a first graph data shard to be migrated, to obtain a data snapshot of the first graph data shard, where the graph data migration information includes a shard identifier of the first graph data shard and a node identifier of the first data storage node, and the data snapshot includes data content and a data point of the first graph data shard at the time of starting the graph data migration; in response to completion of the graph data migration, entering a data storage service mode, and sending a graph data shard deletion notification to the first data storage node, where the graph data shard deletion notification is used to instruct the first data storage node to delete the first graph data shard; and performing, in the data storage service mode, data synchronization with a corresponding first graph data shard of a primary replica based on the data point in the data snapshot.

Optionally, in an example of the above-mentioned aspect, the graph data migration information is determined by a graph data analysis layer in response to a replica expansion request, based on replica metadata of a replica to be expanded and node storage status information of a data storage node in a corresponding data storage node cluster, the replica metadata includes graph topology structure information of the data storage node cluster, and the node storage status information includes an available storage capacity of the data storage node.

Optionally, in an example of the above-mentioned aspect, the replica metadata further includes a shard size of a stored graph data shard and the graph data migration information is determined by the graph data analysis layer based on the replica metadata of the replica to be expanded and the node storage status information of the data storage node in the corresponding data storage node cluster by using a load balancing strategy.

Optionally, in an example of the above-mentioned aspect, the node storage status information of the data storage node is included in the replica metadata.

Optionally, in an example of the above-mentioned aspect, the performing, in the data storage service mode, data synchronization with a corresponding first graph data shard of a primary replica based on the data point in the data snapshot can include the following: reporting the data point in the data snapshot to the graph data analysis layer, where the data point in the data snapshot is used by the graph data analysis layer to determine a data point difference relative to a data point of the corresponding first graph data shard of the primary replica in stored metadata, and is provided to the first data storage node that includes the corresponding first graph data shard; and initiating a data write operation for the second data storage node based on the data point difference by using the first data storage node that includes the corresponding first graph data shard, and performing data synchronization with the corresponding first graph data shard of the primary replica.

Optionally, in an example of the above-mentioned aspect, the performing, in the data storage service mode, data synchronization with a corresponding first graph data shard of a primary replica based on the data point in the data snapshot can include the following: forwarding, by the graph data analysis layer, the data point in the data snapshot to the first data storage node on which the corresponding first graph data shard of the primary replica is located, to determine the data point difference relative to the data point of the stored first graph data shard; and initiating a data write operation for the second data storage node based on the data point difference by using the first data storage node that includes the corresponding first graph data shard, and performing data synchronization with the corresponding first graph data shard of the primary replica.

Optionally, in an example of the above-mentioned aspect, during replica expansion, the first data storage node is always in the data storage service mode.

According to another aspect of the embodiments of this specification, a replica expansion method for a distributed graph database is provided, and includes the following: determining graph data migration information by a graph data analysis layer of a distributed graph database in response to a replica expansion request initiated by an interface layer, and providing the graph data migration information to a second data storage node to be expanded, where the graph data migration information is determined based on replica metadata of a replica to be expanded and node storage status information of a data storage node in a corresponding data storage node cluster, and includes a shard identifier of a first graph data shard to be migrated and a node identifier of a first data storage node that includes the first graph data shard, the replica data includes graph topology structure information of the data storage node cluster, and the node storage status information includes an available storage capacity of the data storage node; in response to reception of the graph data migration information, entering, by the second data storage node, a data copy-only mode, and initiating graph data migration from the first data storage node based on the graph data migration information, to obtain a data snapshot of the first graph data shard, where the data snapshot includes data content and a data point of the first graph data shard at the time of starting the graph data migration; in response to the graph data migration, sending, by the second data storage node, a data storage service mode, and sending a graph data shard deletion notification to the first data storage node, and performing data synchronization with a corresponding first graph data shard of a primary replica based on the data point in the data snapshot; and deleting, by the first data storage node, the first graph data shard in response to the graph data shard deletion notification.

Optionally, in an example of the above-mentioned aspect, the first data storage node is always in the data storage service mode, and the replica expansion method can further include the following: in response to reception of a graph data write request, performing graph data write processing by the first data storage node to perform graph data synchronization.

According to another aspect of the embodiments of this specification, a replica expansion apparatus for a distributed graph database is provided. The replica expansion apparatus is applied to a second data storage node to be expanded, and the replica expansion apparatus includes the following: a mode setting unit, configured to enable the second data storage node to enter a data copy-only mode in response to reception of graph data migration information, and enable the second data storage node to enter a data storage service mode in response to completion of graph data migration, where the graph data migration information includes a shard identifier of a first graph data shard to be migrated and a node identifier of a first data storage node that includes the first graph data shard; a graph data migration unit, configured to initiate, in the data copy-only mode, graph data migration from the first data storage node based on the graph data migration information, to obtain a data snapshot of the first graph data shard, where the data snapshot includes data content and a data point of the first graph data shard at the time of starting the graph data migration; a shard deletion notification unit, configured to send a graph data shard deletion notification to the first data storage node, where the graph data shard deletion notification is used to instruct the first data storage node to delete the first graph data shard; and a graph data synchronization unit, configured to perform, in the data storage service mode, data synchronization with a corresponding first graph data shard of a primary replica based on the data point in the data snapshot.

Optionally, in an example of the above-mentioned aspect, the graph data synchronization unit includes the following: a data point reporting module, configured to report the data point in the data snapshot to the graph data analysis layer, where the data point in the data snapshot is used by the graph data analysis layer to determine a data point difference relative to a data point of the corresponding first graph data shard of the primary replica in stored metadata, and is provided to the first data storage node that includes the corresponding first graph data shard; and a graph data synchronization module, configured to initiate a data write operation for the second data storage node based on the data point difference by using the first data storage node that includes the corresponding first graph data shard, and perform data synchronization with the corresponding first graph data shard of the primary replica.

Optionally, in an example of the above-mentioned aspect, the graph data synchronization unit includes the following: a data point reporting module, configured to forward, by the graph data analysis layer, the data point in the data snapshot to the first data storage node that includes the corresponding first graph data shard of the primary replica, to determine the data point difference relative to the data point of the stored first graph data shard; and a graph data synchronization module, configured to initiate a data write operation for the second data storage node based on the data point difference by using the first data storage node that includes the corresponding first graph data shard, and perform data synchronization with the corresponding first graph data shard of the primary replica.

According to another aspect of the embodiments of this specification, a replica expansion system for a distributed graph database is provided, and includes the following: an interface layer, including a replica expansion request unit that initiates a replica expansion request to a graph data analysis layer; the graph data analysis layer, including a graph data migration information determining unit that determines graph data migration information in response to the replica expansion request and provides the graph data migration information to a second data storage node to be expanded, where the graph data migration information is determined based on replica metadata of a replica to be expanded and node storage status information of a data storage node in a corresponding data storage node cluster, and includes a shard identifier of a first graph data shard to be migrated and a node identifier of a first data storage node that includes the first graph data shard, the replica data includes graph topology structure information of the data storage node cluster, and the node storage status information includes an available storage capacity of the data storage node; and a graph data storage layer, including a first data storage node cluster and the second data storage node to be expanded; where a first data storage node in the first data storage node cluster includes the following: a data snapshot generating unit, configured to generate a data snapshot of the first graph data shard when graph data shard migration with the second data storage node is started, where the data snapshot includes data content and a data point of the first graph data shard at the time of starting graph data migration; and a graph data shard deleting unit, configured to delete, in response to reception of a graph data shard deletion notification, a first graph data shard that has completed the graph data migration; where the second data storage node includes the above-mentioned replica expansion apparatus.

According to another aspect of the embodiments of this specification, a replica expansion apparatus for a distributed graph database is provided. The replica expansion apparatus is applied to a second data storage node to be expanded, and the replica expansion apparatus includes the following: at least one processor; a storage coupled to the at least one processor; and a computer program stored in the storage. The at least one processor executes the computer program to implement the above-mentioned replica expansion method for a distributed graph database.

According to another aspect of the embodiments of this specification, a replica expansion system for a distributed graph database is provided, and includes the following: at least one processor; a storage coupled to the at least one processor; and a computer program stored in the storage. The at least one processor executes the computer program to implement the above-mentioned replica expansion method for a distributed graph database.

BRIEF DESCRIPTION OF DRAWINGS

The essence and advantages of the content of this specification can be further understood by referring to the following accompanying drawings. In the accompanying drawings, similar components or features can have the same reference numerals.

DETAILED DESCRIPTION

The subject matters described in this specification are discussed below with reference to example implementations. It should be understood that the discussion of these implementations is merely intended to enable a person skilled in the art to better understand the subject matters described in this specification, and is not intended to limit the protection scope, applicability, or examples described in the claims. The functions and arrangements of the elements under discussion can be changed without departing from the protection scope of this specification. Various processes or components can be omitted, replaced, or added in various examples as needed. For example, the described method can be performed in a sequence different from the described sequence, and the steps can be added, omitted, or combined. In addition, the features described in some examples can also be combined in other examples.

As used in this specification, the term "include" and variants thereof represent an open term, which means "including but not limited to". The term "based on" represents "at least partially based on". The terms "one embodiment" and "an embodiment" represent "at least one embodiment". The term "another embodiment" represents "at least one other embodiment". The terms "first", "second", etc. can refer to different or the same objects. Other definitions, whether explicit or implicit, can be included below. Unless explicitly stated in the context, the definition of a term is consistent throughout this specification.

A flowchart used in this specification illustrates operations implemented by a system according to some embodiments of this specification. It should be clearly understood that operations in the flowchart may not be implemented in sequence. In contrast, the operations can be implemented in reverse order or simultaneously. In addition, one or more other operations can be added to the flowchart. One or more operations can be removed from the flowchart.

Figure 1:
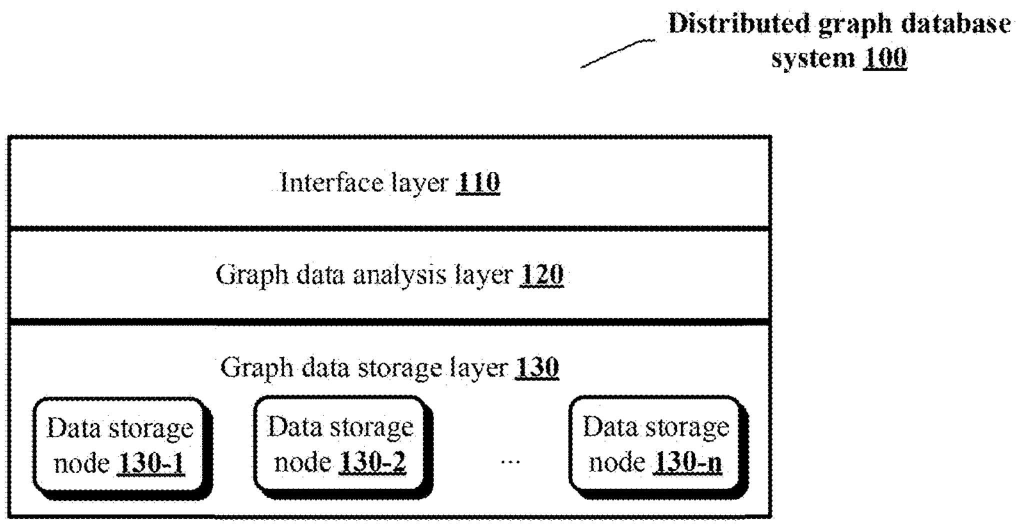
FIG. 1 is an example schematic diagram illustrating a distributed graph database system.

FIG. 1 is an example schematic diagram illustrating an architecture of a distributed graph database system 100.

As shown in FIG. 1, the distributed graph database system 100 includes an interface layer 110, a graph data analysis layer 120, and a graph data storage layer 130. The interface layer 110 is configured to implement interaction with the outside of a graph database system, for example, receive a graph data processing request of a client device on which an upstream/downstream application of a graph database is installed, for example, a graph data read/write request or a replica expansion request. In addition, the interface layer 110 can further perform other operations on the graph database, such as whitescreen of a graph database function, parameter security check, graph database function combination, or a graph database visualization operation. In some embodiments, the interface layer 110 can also receive graph data storage information of a data storage node, and make a replica expansion decision based on the graph data storage information. When it is decided that replica expansion needs to be performed for a replica, a replica expansion request is initiated to the graph data analysis layer 120.

Figure 2:
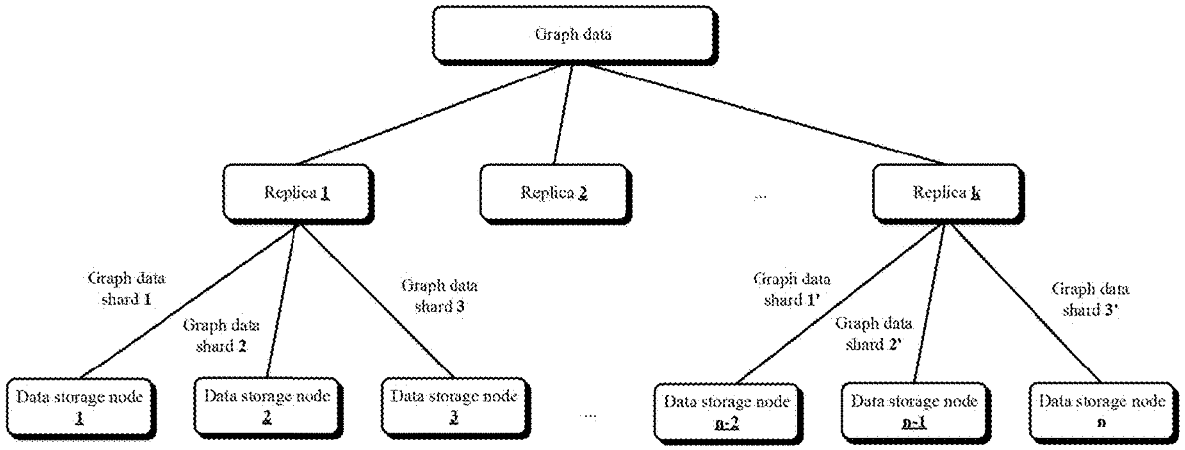
FIG. 2 is an example schematic diagram illustrating a graph storage topology structure of graph data.

The graph data analysis layer 120 is configured to implement metadata management of stored graph data, for example, metadata generation, storage, and update. Metadata of the stored graph data includes, for example, graph storage topology structure information of the graph data. A graph storage topology structure can include, for example, how many replicas that graph data are made, a data storage node on which each replica is stored, and a graph data shard stored on each data storage node. The graph storage topology structure information can include a shard identifier of a graph data shard and a node identifier of a data storage node that includes the graph data shard. FIG. 2 is an example schematic diagram illustrating graph storage topology structure information of graph data.

As shown in FIG. 2, when graph data is stored in a distributed manner, the graph data is replicated into a plurality of replicas (for example, k replicas). Then, graph data of each replica are sharded, and therefore, a plurality of graph data shards (for example, three graph data shards) are obtained, and then, shard data of one or more graph data shards are stored on one data storage node in a data storage node cluster through hashing. In this way, distributed graph data storage is completed. The graph storage topology structure information can include a shard identifier of a graph data shard and a node identifier of a data storage node that includes the graph data shard. It is worthwhile to note that, for different replicas, a same graph data shard strategy is used to obtain same graph data shards through fragmentation.

In addition, metadata can further include shard information and a data point (CommitID) of a graph data shard stored on the data storage node. The shard information of the graph data shard can include a shard identifier and/or a shard size. The data point is used to indicate a data write status of the graph data shard. During storage of the graph data shard, the graph data shard is generally written in segments. For example, the graph data shard can be divided into 10 data segments to be written in sequence. Each time one data segment is written, it is equivalent to completing a committing process, and corresponds to one data point. Therefore, the data point can reflect data storage progress of the graph data shard. In some embodiments, the data point can be, for example, composed of a SHA-1 hash value of 40 bits. For example, the data point can be generated by performing hash calculation on committed graph data shard content and commitment information (for example, timestamp information).

In some embodiments, the metadata can further include node storage status information of the data storage node. The node storage status information can include, for example, a rated storage capacity, an available storage capacity, a node working mode (readable/writable, unreadable/unwritable, etc.) of the data storage node and/or a progress activation status (an active state, an inactive state, etc.).

The graph data storage layer 130 is configured to implement distributed storage of graph data. The graph data storage layer 130 can include a plurality of data storage node clusters, and each data storage node cluster is used to store one replica of the graph data. Each data storage node cluster can include one or more data storage nodes, and each data storage node is configured to store some graph data shards (for example, one or more graph data shards) of the graph data.

In some embodiments, each of the interface layer 110 and the graph data analysis layer 120 can be implemented by one or more node devices. In some embodiments, the interface layer 110 and the graph data analysis layer 120 can be alternatively implemented by the same node device.

Each component at the interface layer 110, the graph data analysis layer 120, and the graph data storage layer 130 can communicate directly or through a network. In some embodiments, the network can be any one or more of a wired network or a wireless network. Examples of the network can include a cable network, a fiber-optic network, a telecommunication network, an enterprise internal network, the Internet, a local area network (LAN), a wide area network (WAN), a wireless local area network (WLAN), a metropolitan area network (MAN), a public switched telephone network (PSTN), a Bluetooth network, a ZigBee network, near field communication (NFC), an intra-device bus, an intra-device line, etc., or any combination thereof. In some embodiments, the interface layer 110 and the graph data analysis layer 120 can form a server-client (S/C) architecture with the graph data storage layer 130.

As graph data is continuously generated, a stored graph data capacity becomes increasingly larger, and a data storage capacity or a service capability of a data storage node cluster allocated to a single replica is no longer enough to store the graph data, or a data storage capacity or a service capability is no longer enough to store the graph data due to performance deterioration of the data storage node. In this case, replica expansion needs to be initiated for the replica. The term “replica expansion” can refer to data storage node expansion for a replica, that is, adding a new data storage node to a data storage node cluster used to store the replica, and migrating a part of graph data shards in the data storage node cluster to the added new data storage node.

Since a service carried in the distributed graph database needs to ensure a real-time online service and ensure the integrity and the security of graph data, when the data storage node cluster initiates replica expansion, it is necessary to ensure that a graph data shard to be migrated is completely migrated to an expanded new data storage node, and to ensure, at the same time, an original data storage node in the current data storage node cluster normally provides a data storage service.

In view of this, a replica expansion scheme for a distributed graph database is proposed. In this replica expansion scheme, for a data storage node to be expanded, during graph data shard migration, the data storage node is set to a data copy-only mode, so that in a graph data shard migration process, only data copy is performed but a read/write service is not provided to the outside; and in addition, after the graph data shard migration is completed, the data storage node is set to a data storage service mode, and data synchronization is performed with a corresponding graph data shard in a primary replica based on a data point recorded in a data snapshot generated during the graph data shard migration, thereby ensuring the integrity and the security of graph data on the data storage node to be expanded.

Replica expansion methods, apparatuses, and systems for a distributed graph database according to embodiments of this specification are described below with reference to the accompanying drawings.

Figure 3:
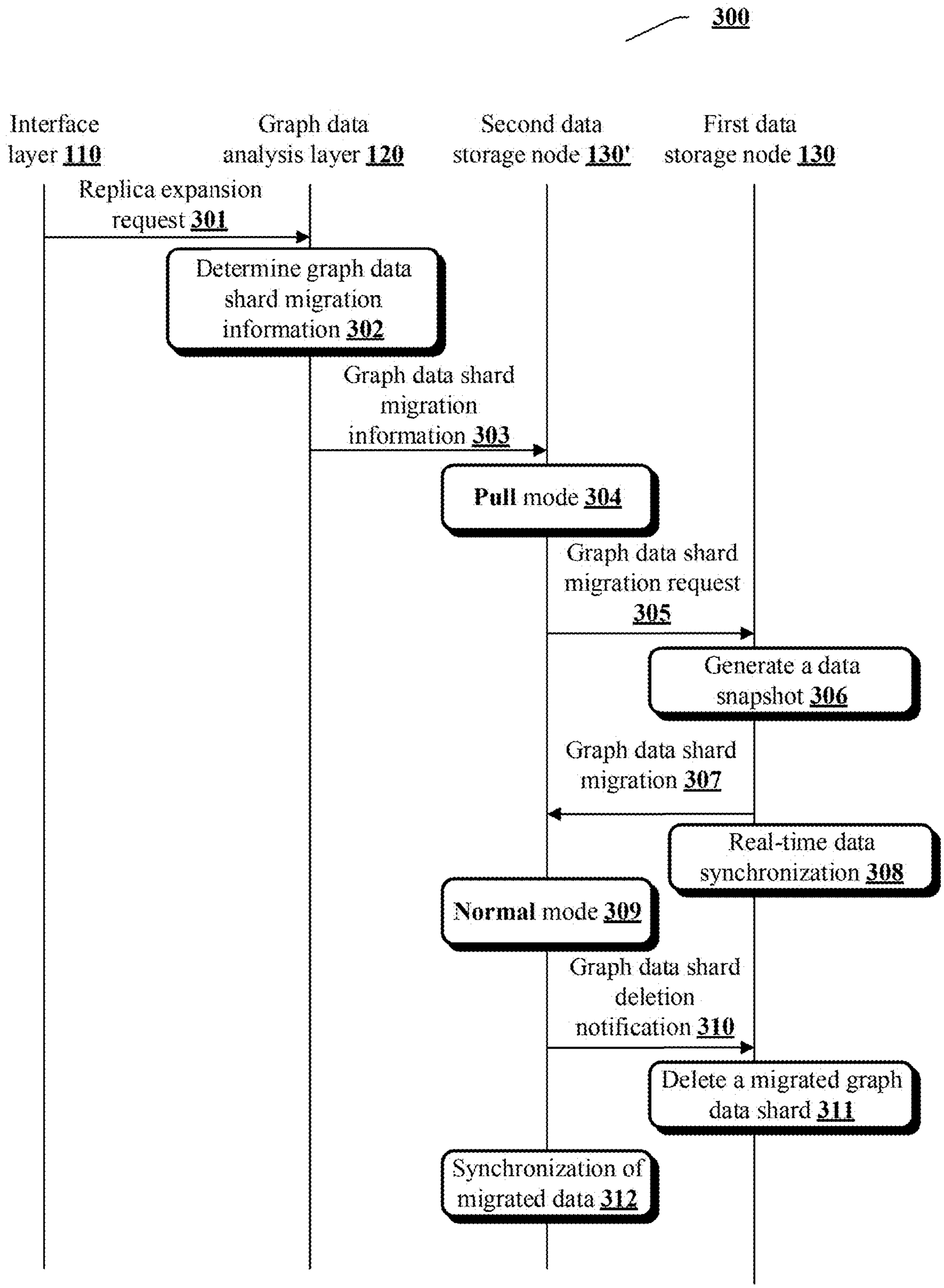
FIG. 3 is an example flowchart illustrating a replica expansion method for a distributed graph database, according to embodiments of this specification.

FIG. 3 is an example flowchart illustrating a replica expansion method 300 for a distributed graph database, according to embodiments of this specification.

As shown in FIG. 3, in 301, an interface layer 110 initiates a replica expansion request to a graph data analysis layer 120, where the replica expansion request includes at least a replica identifier (ID) of a replica to be expanded. For example, in some embodiments, the interface layer 110 can receive graph data storage status information of a first data storage node in a data storage node cluster corresponding to each replica, for example, receive the graph data storage status information of the first data storage node corresponding to each replica from a status register or a graph data storage status monitor, and make a replica expansion decision based on the received graph data storage status information of the first data storage node corresponding to each replica. When it is decided that a data storage node needs to be expanded for a replica (that is, the replica needs to be expanded), the replica expansion request is initiated to the graph data analysis layer 120 to add a second data storage node to a data storage node cluster of the replica. In some embodiments, the interface layer 110 can also initiate the replica expansion request to the graph data analysis layer 120 in response to a manually initiated replica expansion operation.

In 302, in response to reception of the replica expansion request, the graph data analysis layer 120 determines graph data shard migration information. The determined graph data migration information includes a shard identifier of a first graph data shard to be migrated and a node identifier of a first data storage node that includes the first graph data shard. That is, the graph data analysis layer 120 determines which graph data shards on which first data storage nodes are to be migrated to the second data storage node. In some embodiments, the graph data migration information can further include a node identifier of the second data storage node.

In some embodiments, the graph data analysis layer 120 can obtain, from stored metadata based on a replica identifier of a replica to be expanded in the replica expansion request, replica metadata corresponding to the replica to be expanded. The replica metadata can include graph storage topology structure information of replica data and node status information of each first data storage node. The node status information of the data storage node can include, for example, an available storage capacity of the data storage node. The graph data analysis layer 120 can determine graph data migration information based on the graph storage topology structure information of the replica data and the node status information of each first data storage node. In some embodiments, the graph data analysis layer 120 can determine the graph data migration information based on the replica metadata of the replica to be expanded and node storage status information of each first data storage node by using a load balancing strategy. In some embodiments, the replica metadata can further include a shard size of a graph data shard stored on the data storage node. In this case, the graph data analysis layer 120 can determine, by using a load balancing strategy, the graph data migration information based on the replica metadata of the replica to be expanded, the node storage status information of each first data storage node, and a shard size of a graph data shard stored on each first data storage node. In some embodiments, the node storage status information can be further used to indicate capability indication status information of a storage service capability of the data storage node.

In some embodiments, after the graph data shard migration information is determined, the graph data analysis layer 120 can further update metadata. For example, the second data storage node is added to a data storage node cluster corresponding to the replica to be expanded, and graph storage topology structure information of the data storage node cluster added with the second data storage node and shard information, a data point, etc. of a graph data shard stored on the data storage node are updated based on the graph data shard migration information. In this way, the replica metadata of the replica to be expanded is updated.

In 303, the graph data analysis layer 120 sends the graph data migration information to a second data storage node 130'. In 304, after receiving the graph data migration information, the second data storage node 130' enters a data copy-only mode (Pull mode). In the Pull mode, a graph database service is merely pulled up but a data storage service is not loaded, so that the second data storage node has only a data copy function but does not have a data storage service capability.

After entering the Pull mode, the second data storage node 130' initiates, based on the graph data migration information, graph data migration from a first data storage node that stores a first graph data shard to be migrated, to obtain a data snapshot of the first graph data shard.

Figures 4, 5:
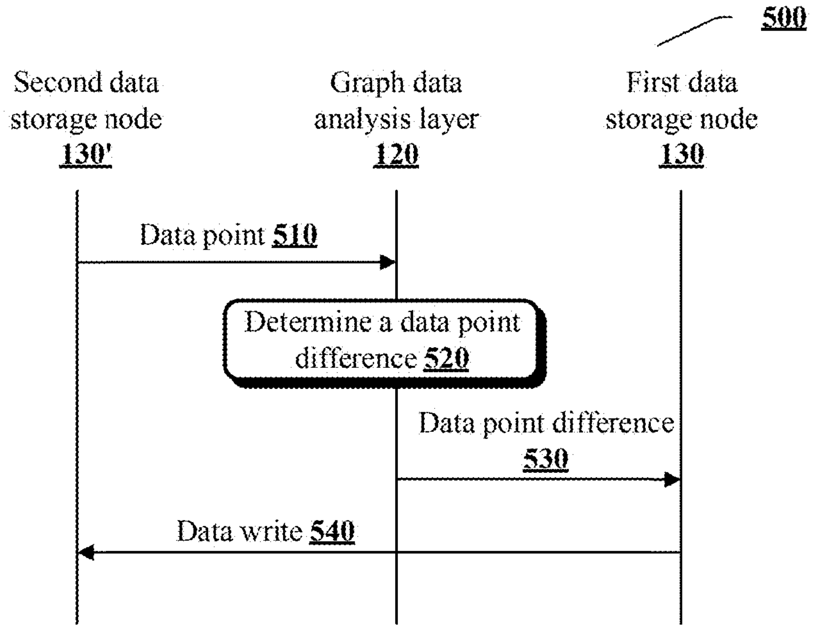
FIG. 4 is an example schematic diagram illustrating a data snapshot, according to embodiments of this specification.
FIG. 5 is an example flowchart illustrating a synchronization process for migrated graph data, according to embodiments of this specification.

For example, in some embodiments, as shown in FIG. 3, in 305, the second data storage node 130' sends a graph data migration request to a first data storage node 130 that includes the first graph data shard to be migrated. The graph data migration request includes a graph data shard identifier of the first graph data shard. After receiving the graph data migration request, in 306, the first data storage node 130 generates a data snapshot of the first graph data shard at a current moment. The generated data snapshot includes data content of the first graph data shard and a data point at the time of starting data migration. The data point can be included in the first graph data shard. FIG. 4 is an example schematic diagram of the data snapshot.

After generating the data snapshot, in 307, the first data storage node 130 performs a graph data migration process from the first graph data shard to the second data storage node 130'. In addition, the first data storage node 130 always maintains a data storage service mode (Normal mode) during replica expansion. In the Normal mode, the graph database service is pulled up and the data storage service is loaded, so that the data storage node has the data storage service capability. In this case, at any moment during replica expansion, provided that the first data storage node receives the graph data storage request, in 308, corresponding graph data storage processing is performed to perform data synchronization in real time, for example, synchronize data update of written data in real time.

After the above-mentioned graph data migration is completed, in 309, the second data storage node 130' enters the Normal mode, and after entering the Normal mode, in 310, the second data storage node 130' sends a graph data shard deletion notification to the first data storage node 130, to instruct the first data storage node 130 to delete a first graph data shard that has completed the graph data migration. After receiving the graph data shard deletion notification, in 311, the first data storage node 130 deletes the first graph data shard that has completed the graph data migration.

In 312, the second data storage node 130' performs data synchronization with a corresponding first graph data shard in a primary replica (Leader replica) based on the data point in the data snapshot of the first graph data shard. It is worthwhile to note that, in a distributed graph database, replicas can include a primary replica (Leader replica) and secondary replicas (Follower replica). During data synchronization, data synchronization in the primary replica (that is, being written into the primary replica) is usually performed first, and then the secondary replica is synchronized based on data in the primary replica. It is worthwhile to note that, during data synchronization on a data storage node to be expanded, if a replica to be expanded is a current primary replica, a new primary replica needs to be selected, and the replica to be expanded is downgraded to a secondary replica. A data synchronization process on the data storage node to be expanded can be implemented in a plurality of manners.

FIG. 5 is an example flowchart illustrating a synchronization process 500 for migrated graph data, according to embodiments of this specification.

As shown in FIG. 5, in 510, a second data storage node 130' reports a data point in a data snapshot of a first graph data shard to a graph data analysis layer 120.

After receiving the data point in the data snapshot, in 520, the graph data analysis layer 120 queries, in stored metadata, a data point of a corresponding first graph data shard in a primary replica and a first data storage node that includes the corresponding first graph data shard. Then, the graph data analysis layer 120 determines a data point difference between the data point in the data snapshot and the queried data point of the corresponding first graph data shard, and provides, in 530, the determined data point difference for the first data storage node that includes the corresponding first graph data shard.

After receiving the data point difference, in 540, the first data storage node that includes the corresponding first graph data shard initiates a data write operation for the second data storage node based on the data point difference, and performs data synchronization with the corresponding first graph data shard of the primary replica. For example, if the data point in the data snapshot corresponds to the fifth data segment in ten data segments, and the latest data segment in a current primary replica is the ninth data segment, the sixth data segment to the ninth data segment are used as data to be synchronized, and an operation of writing the data to be synchronized is initiated for the second data storage node, that is, the first data storage node writes the sixth data segment to the ninth data segment to the second data storage node.

Figure 6:
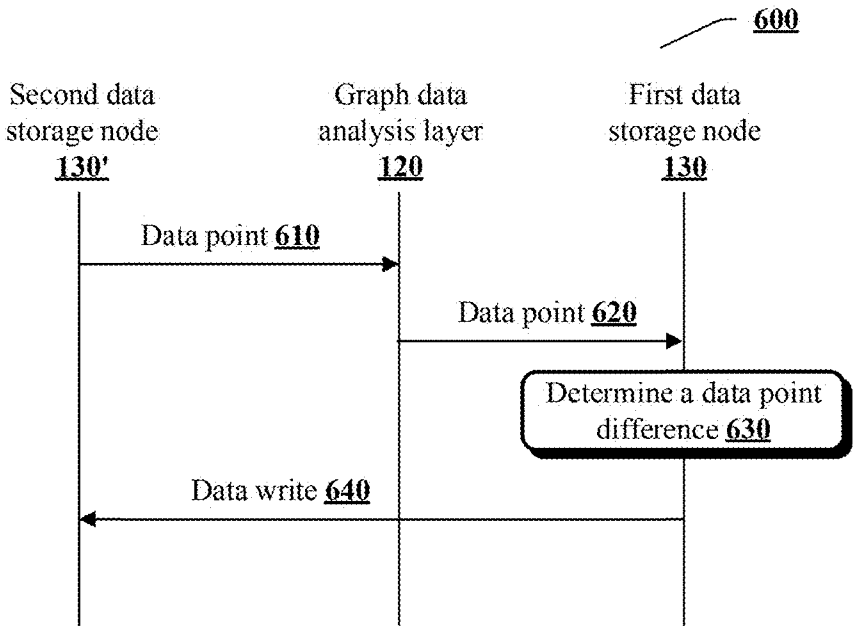
FIG. 6 is another example flowchart illustrating a synchronization process for migrated graph data, according to embodiments of this specification.

FIG. 6 is another example flowchart illustrating a synchronization process 700 for migrated graph data, according to embodiments of this specification.

As shown in FIG. 5, in 610, a second data storage node 130' reports a data point in a data snapshot of a first graph data shard to a graph data analysis layer 120.

After receiving the data point in the data snapshot, in 620, the graph data analysis layer 120 queries, in stored metadata, a first data storage node that includes a corresponding first graph data shard in a primary replica. Then, the graph data analysis layer 120 forwards the received data point in the data snapshot to the first data storage node that includes the corresponding first graph data shard.

After receiving the data point in the data snapshot, in 630, the first data storage node that includes the corresponding first graph data shard determines a data point difference between the received data point in the data snapshot and a stored data point of the corresponding first graph data shard, and in 640, the first data storage node that includes the corresponding first graph data shard initiates a data write operation for a second data storage node based on the data point difference, and performs data synchronization with the corresponding first graph data shard of the primary replica.

Figure 7:
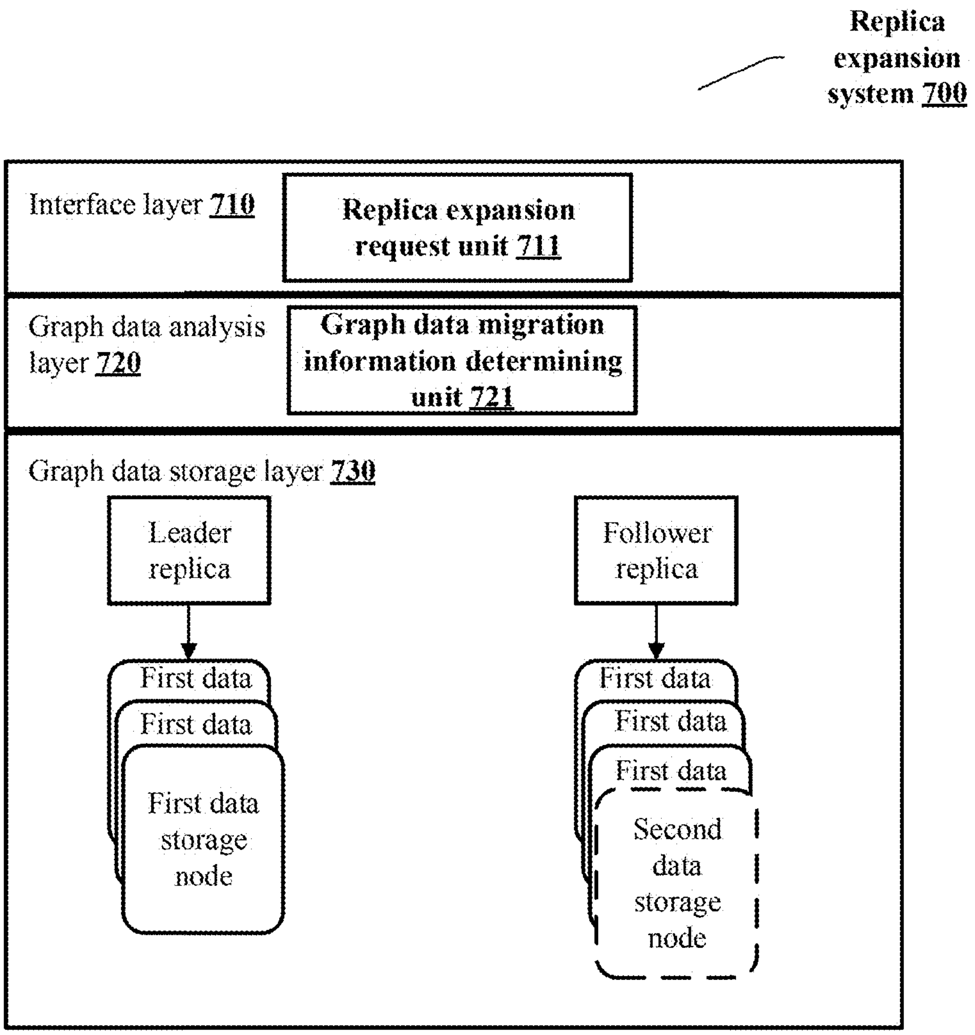
FIG. 7 is an example block diagram illustrating a replica expansion system for a distributed graph database, according to embodiments of this specification.

FIG. 7 is an example schematic diagram illustrating a replica expansion system 700 for a distributed graph database, according to embodiments of this specification. As shown in FIG. 7, the replica expansion system 700 includes an interface layer 710, a graph data analysis layer 720, and a graph data storage layer 730.

The interface layer 710 includes a replica expansion request unit 711. The replica expansion request unit 711 is configured to initiate a replica expansion request to the graph data analysis layer 720. The replica expansion request includes a replica identifier of a replica to be expanded.

The graph data analysis layer 720 includes a graph data migration information determining unit 721. The graph data migration information determining unit 721 is configured to determine graph data migration information in response to reception of the replica expansion request from the replica expansion request unit 711, and provide the graph data migration information to a second data storage node to be expanded. The determined graph data migration information includes a shard identifier of a first graph data shard to be migrated and a node identifier of a first data storage node that includes the first graph data shard.

In some embodiments, the graph data migration information determining unit 721 can obtain, from stored metadata based on a replica identifier of a replica to be expanded in the replica expansion request, replica metadata corresponding to the replica to be expanded. The replica metadata can include graph storage topology structure information of replica data and node status information of each first data storage node. The node status information of the data storage node can include, for example, an available storage capacity of the data storage node. The graph data migration information determining unit 721 can determine the graph data migration information based on the graph storage topology structure information of the replica data and the node status information of each first data storage node. In some embodiments, the graph data migration information determining unit 721 can determine the graph data migration information based on the replica metadata of the replica to be expanded and node storage status information of each first data storage node by using a load balancing strategy. In some embodiments, the replica metadata can further include a shard size of a graph data shard stored on the data storage node. In this case, the graph data migration information determining unit 721 can determine, by using a load balancing strategy, the graph data migration information based on the replica metadata of the replica to be expanded, the node storage status information of each first data storage node, and a shard size of a graph data shard stored on each first data storage node. In some embodiments, the node storage status information can be further used to indicate capability indication status information of a storage service capability of the data storage node.

In some embodiments, the graph data analysis layer 720 can further include a metadata updating unit (not shown). The metadata updating unit is configured to update metadata after determining the graph data shard migration information. For example, the metadata updating unit can add a second data storage node to a data storage node cluster corresponding to the replica to be expanded, and update, based on the graph data shard migration information, graph storage topology structure information of the data storage node cluster added with the second data storage node and shard information, a data point, etc. of a graph data shard stored on the data storage node. In this way, the replica metadata of the replica to be expanded is updated.

The graph data storage layer 730 includes a first data storage node cluster for each replica and a second data storage node to be expanded for the replica to be expanded, for example, a first data storage node cluster for a leader replica and a first data storage node cluster for a follower replica. A first data storage node in a first data storage node cluster corresponding to each replica stores graph data shards of the corresponding replica in a distributed data storage manner. The first data storage node can further include a data snapshot generating unit and a graph data shard deleting unit. The data snapshot generating unit is configured to generate, when graph data shard migration with the second data storage node is started, a data snapshot of a first graph data shard to be migrated. The generated data snapshot includes data content and a data point of the first graph data shard at the time of starting graph data migration. The graph data shard deleting unit is configured to delete, in response to reception of a graph data shard deletion notification, a first graph data shard that has completed the graph data migration.

Figure 8:
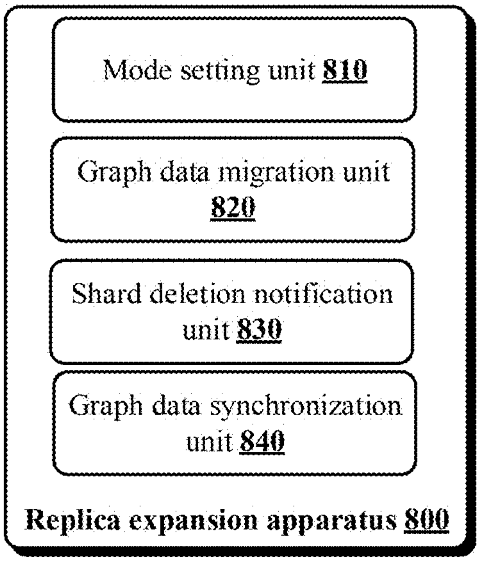
FIG. 8 is an example block diagram illustrating a replica expansion apparatus applied to a data storage node to be expanded, according to embodiments of this specification.

The second data storage node includes a replica expansion apparatus configured to implement replica expansion for a distributed graph database. FIG. 8 is an example block diagram illustrating a replica expansion apparatus 800 applied to a data storage node to be expanded, according to embodiments of this specification. As shown in FIG. 8, the replica expansion apparatus 800 includes a mode setting unit 810, a graph data migration unit 820, an allocation deletion notification unit 830, and a graph data synchronization unit 840.

The mode setting unit 810 is configured to enable a second data storage node to enter a data copy-only mode in response to reception of graph data migration information, and enable the second data storage node to enter a data storage service mode in response to completion of graph data migration.

The graph data migration unit 820 is configured to initiate graph data migration from the first data storage node based on the graph data migration information in the data copy-only mode, to obtain a data snapshot of a first graph data shard. The obtained data snapshot includes data content and a data point of the first graph data shard at the time of starting the graph data migration.

The shard deletion notification unit 830 is configured to send a graph data shard deletion notification to the first data storage node. The graph data shard deletion notification is used to instruct the first data storage node to delete a first graph data shard that has completed data migration.

The graph data synchronization unit 840 is configured to perform, in the data storage service mode, data synchronization with a corresponding first graph data shard of a primary replica based on the data point in the data snapshot.

Figure 9:
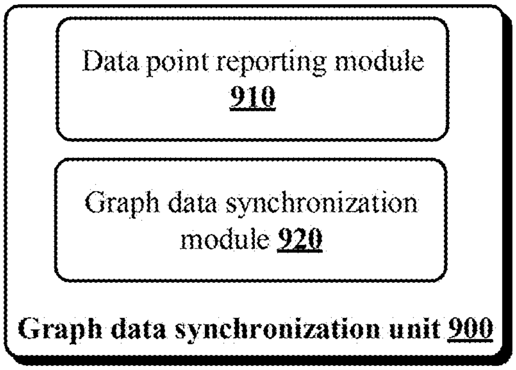
FIG. 9 is an example block diagram illustrating a graph data synchronization unit, according to embodiments of this specification.

FIG. 9 is an example block diagram illustrating a graph data synchronization unit 900, according to embodiments of this specification. As shown in FIG. 9, the graph data synchronization unit 900 includes a data point reporting module 910 and a graph data synchronization unit 920.

The data point reporting module 910 is configured to report a data point in a data snapshot to a graph data analysis layer. In some embodiments, after receiving the data point, the graph data analysis layer uses the data point in the data snapshot to determine a data point difference relative to a data point (a current data point) of a corresponding first graph data shard in a primary replica in stored metadata. Then, the determined data point difference is provided for a first data storage node that includes the corresponding first graph data shard. In some embodiments, after receiving the data point, the graph data analysis layer forwards the received data point to the first data storage node that includes the corresponding first graph data shard, to determine, on the first data storage node that includes the corresponding first graph data shard, a data point difference between the data point in the data snapshot and a stored data point of the corresponding first graph data shard.

The graph data synchronization module 920 is configured to initiate a data write operation for the second data storage node based on the data point difference by using the first data storage node that includes the corresponding first graph data shard, and perform data synchronization with the corresponding first graph data shard of the primary replica.

The replica expansion method, the replica expansion apparatus, and the replica expansion system for a distributed graph database according to embodiments of this specification are described above with reference to FIG. 1 to FIG. 9. The above-mentioned replica expansion apparatus and replica expansion system can be implemented by using hardware, or can be implemented by using software or a combination of hardware and software.

Figure 10:
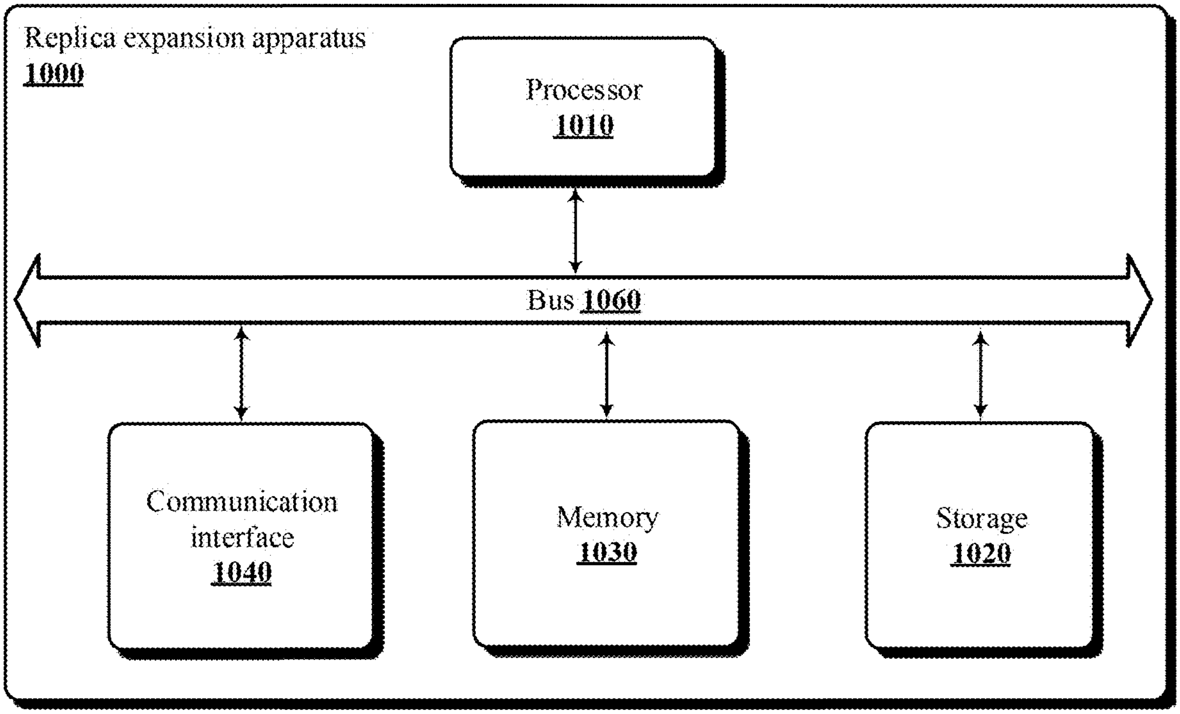
FIG. 10 is an example schematic diagram illustrating a replica expansion apparatus implemented based on a computer system and applied to a data storage node to be expanded, according to embodiments of this specification.

FIG. 10 is an example schematic diagram illustrating a replica expansion apparatus 1000 implemented based on a computer system and applied to a data storage node to be expanded, according to embodiments of this specification. As shown in FIG. 10, the replica expansion apparatus 1000 can include at least one processor 1010, a storage (for example, a nonvolatile memory) 1020, a memory 1030, and a communication interface 1040, and the at least one processor 1010, the storage 1020, the memory 1030, and the communication interface 1040 are connected together through a bus 1060. The at least one processor 1010 executes at least one computer-readable instruction (that is, the above-mentioned elements implemented in a software form) stored or encoded in the storage.

In an embodiment, the storage stores a computer-executable instruction, and when the computer-executable instruction is executed, the at least one processor 1010 is enabled to perform the following: in response to reception of graph data migration information, entering a data copy-only mode and initiating, based on the graph data migration information, graph data migration from a first data storage node that stores a first graph data shard to be migrated, to obtain a data snapshot of the first graph data shard, where the graph data migration information includes a shard identifier of the first graph data shard and a node identifier of the first data storage node, and the data snapshot includes data content and a data point of the first graph data shard at the time of starting the graph data migration; in response to completion of the graph data migration, entering a data storage service mode, and sending a graph data shard deletion notification to the first data storage node, where the graph data shard deletion notification is used to instruct the first data storage node to delete the first graph data shard; and performing, in the data storage service mode, data synchronization with a corresponding first graph data shard of a primary replica based on the data point in the data snapshot.

It should be understood that, when being executed, the computer-executable instruction stored in the storage enables the at least one processor 1010 to perform various operations and functions described above with reference to FIG. 1 to FIG. 9 in the embodiments of this specification.

Figure 11:
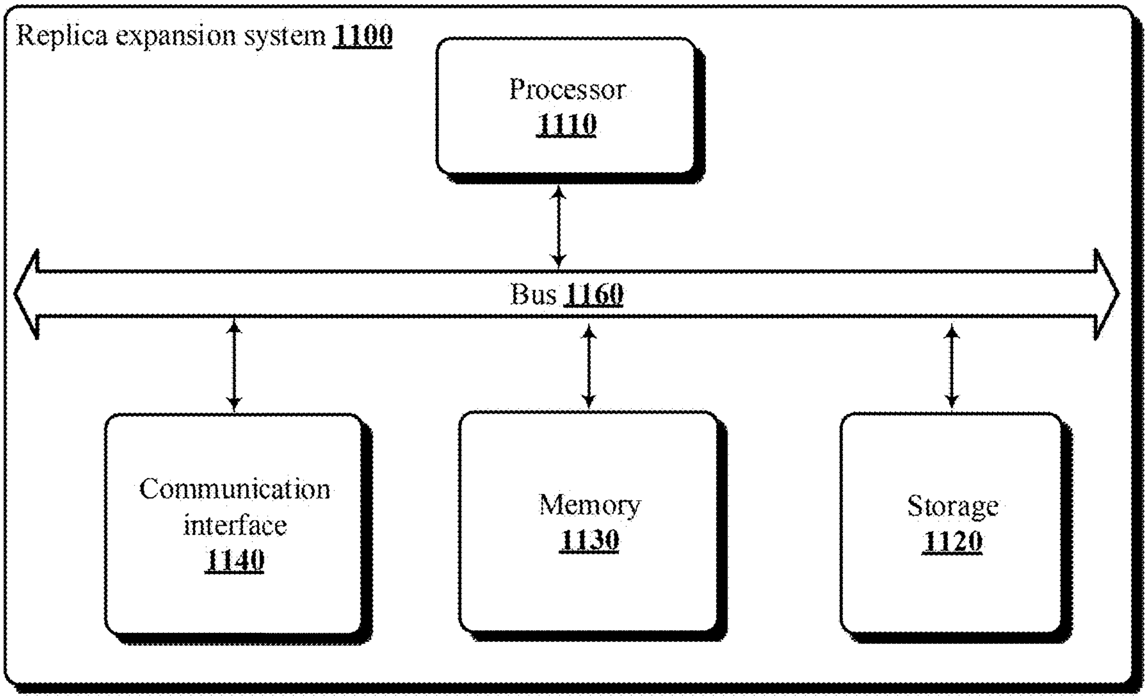
FIG. 11 is an example schematic diagram illustrating a replica expansion system for a distributed graph database implemented based on a computer system, according to embodiments of this specification.

FIG. 11 is an example schematic diagram illustrating a replica expansion system 1100 for a distributed graph database implemented based on a computer system, according to embodiments of this specification. As shown in FIG. 11, the replica expansion system 1100 can include at least one processor 1110, a storage (for example, a non-volatile memory) 1120, a memory 1130, and a communication interface 1140, and the at least one processor 1110, the storage 1120, the memory 1130, and the communication interface 1140 are connected together by using a bus 1160.

The at least one processor 1110 executes at least one computer-readable instruction (that is, the above-mentioned elements implemented in a software form) stored or encoded in the storage.

In an embodiment, the storage stores a computer-executable instruction, and when the computer-executable instruction is executed, the at least one processor 1110 is enabled to perform the following: determining graph data migration information by a graph data analysis layer of a distributed graph database in response to a replica expansion request initiated by an interface layer, and providing the graph data migration information to a second data storage node to be expanded, where the graph data migration information is determined based on replica metadata of a replica to be expanded and node storage status information of a data storage node in a corresponding data storage node cluster, and includes a shard identifier of a first graph data shard to be migrated and a node identifier of a first data storage node that includes the first graph data shard, the replica data includes graph topology structure information of the data storage node cluster, and the node storage status information includes an available storage capacity of the data storage node; in response to reception of the graph data migration information, entering, by the second data storage node, a data copy-only mode, and initiating graph data migration from the first data storage node based on the graph data migration information, to obtain a data snapshot of the first graph data shard, where the data snapshot includes data content and a data point of the first graph data shard at the time of starting the graph data migration; in response to the graph data migration, sending, by the second data storage node, a data storage service mode, and sending a graph data shard deletion notification to the first data storage node, and performing data synchronization with a corresponding first graph data shard of a primary replica based on the data point in the data snapshot; and deleting, by using the first data storage node, the first graph data shard in response to the graph data shard deletion notification.

It should be understood that, when being executed, the computer-executable instruction stored in the storage enables the at least one processor 1110 to perform various operations and functions described above with reference to FIG. 1 to FIG. 9 in the embodiments of this specification.

According to an embodiment, a program product such as a machine-readable medium (for example, a non-transitory machine-readable medium) is provided. The machine-readable medium can have an instruction (that is, the above-mentioned elements implemented in a software form). When the instruction is executed by a machine, the machine is enabled to perform the above-mentioned operations and functions described with reference to FIG. 1 to FIG. 9 in the embodiments of this specification. Specifically, a system or an apparatus with a readable storage medium can be provided, the readable storage medium stores software program code for implementing the functions in any one of the embodiments described above, and a computer or a processor of the system or the apparatus is enabled to read and execute the instructions stored in the readable storage medium.

In this case, the program code read from the readable medium can implement the functions in any one of the embodiments described above, and therefore the machine-readable code and the readable storage medium storing the machine-readable code form a part of this specification.

Embodiments of the readable storage medium include a floppy disk, a hard disk, a magneto-optical disk, an optical disc (such as a CD-ROM, a CD-R, a CD-RW, a DVD-ROM, a DVD-RAM, a DVD-RW, and a DVD-RW), a magnetic tape, a non-volatile memory card, and a ROM. Alternatively, the program code can be downloaded from a server computer or a cloud by a communication network.

According to one or more embodiments, a computer program product is provided. The computer program product includes a computer program, and when the computer program is executed by a processor, the processor is enabled to perform operations and functions described above with reference to FIG. 1 to FIG. 9 in the embodiments of this specification.

A person skilled in the art should understand that variations and modifications can be made to the embodiments disclosed above without departing from the essence of this application. Therefore, the protection scope of this application shall be subject to the appended claims.

It is worthwhile to note that, not all steps and units in the above-mentioned processes and system structural diagrams are mandatory, and some steps or units can be ignored according to an actual requirement. An execution sequence of the steps is not fixed, and can be determined as needed. The apparatus structure described in the above-mentioned embodiments can be a physical structure, or can be a logical structure. In other words, some units can be implemented by the same physical entity, or some units can be implemented by a plurality of physical entities or implemented jointly by some components in a plurality of independent devices.

In the above-mentioned embodiments, the hardware units or modules can be implemented by using a mechanical method or an electrical method. For example, a hardware unit, module, or processor can include a permanent dedicated circuit or logic (for example, a dedicated processor, an FPGA, or am ASIC) to complete corresponding operations. The hardware unit or processor can further include programmable logic or a programmable circuit (for example, a general-purpose processor or another programmable processor), so that software can perform temporary settings to complete corresponding operations. Specific implementations (mechanical methods, dedicated permanent circuits, or temporarily disposed circuits) can be determined based on cost and time considerations.

The specific implementations illustrated above with reference to the accompanying drawings describe example embodiments, but do not represent all embodiments that can be implemented or fall within the protection scope of the claims. The term "example" used throughout this specification means "used as an example, an instance, or an illustration", but does not mean "preferred" or "advantageous" over other embodiments. Specific implementations include specific details for the purpose of providing an understanding of the described technologies. However, these technologies can be implemented without these specific details. In some instances, to avoid obscuring the described concepts in the embodiments, well-known structures and apparatuses are shown in a form of a block diagram.

The above-mentioned descriptions of this disclosure are provided to enable any person of ordinary skill in the art to implement or use this disclosure. Various modifications made to this disclosure are apparent to a person of ordinary skill in the art, and the general principles defined in this specification can also be applied to other variants without departing from the protection scope of this disclosure. Therefore, this disclosure is not limited to the examples and designs described in this specification, but corresponds to the widest scope of principles and novel features disclosed in this specification.

What is claimed is:

1. A computer-implemented method for expanding a distributed graph database, comprising:

in response to reception of graph data migration information, entering a data copy-only mode that disables a capability of a second data storage node to provide a read/write service to a client device;

initiating, in the data copy-only mode, and based on the graph data migration information, graph data migration from a first data storage node that stores a first graph data shard to be migrated, to obtain a data snapshot of the first graph data shard without processing any graph data read or write requests received from the client device, wherein the graph data migration information comprises a shard identifier of the first graph data shard and a node identifier of the first data storage node, wherein initiating the graph data migration comprises sending a graph data migration request comprising the shard identifier to the first data storage node corresponding to the node identifier, and wherein the data snapshot comprises data content and a data point of the first graph data shard at a time of starting the graph data migration;

in response to completion of the graph data migration, entering a data storage service mode that enables the capability of the second data storage node to provide the read/write service to the client device, and sending a graph data shard deletion notification to the first data storage node, wherein the graph data shard deletion notification is used to instruct the first data storage node to delete the first graph data shard; and performing, in the data storage service mode, data synchronization with a corresponding first graph data shard of a primary replica based on the data point in the data snapshot, comprising:

forwarding the data point in the data snapshot to the first data storage node that comprises the corresponding first graph data shard of the primary replica, to determine a data point difference relative to the data point of the stored first graph data shard; and initiating a data write operation for the second data storage node based on the data point difference by using the first data storage node that comprises the corresponding first graph data shard, and performing data synchronization with the corresponding first graph data shard of the primary replica.

2. The computer-implemented method of claim 1, wherein:

the graph data migration information is determined by a graph data analysis layer in response to a replica expansion request, based on replica metadata of a replica to be expanded and node storage status information of a data storage node in a corresponding data storage node cluster;

the replica metadata comprises graph topology structure information of the corresponding data storage node cluster, the graph topology structure information comprising a total count of replicas that have been generated in the distributed graph database, a data storage node on which each replica is stored, and a graph data shard stored on each data storage node; and the node storage status information comprises an available storage capacity and a node working mode of the data storage node.

3. The computer-implemented method of claim 2, wherein the replica metadata comprises a shard size of a stored graph data shard, and the graph data migration information is determined by the graph data analysis layer based on the replica metadata of the replica to be expanded and the node storage status information of the data storage node in the corresponding data storage node cluster by using a load balancing strategy.

4. The computer-implemented method of claim 3, wherein the node storage status information of the data storage node is comprised in the replica metadata.

5. The computer-implemented method of claim 1, wherein during replica expansion, the first data storage node is always in the data storage service mode.

6. A non-transitory, computer-readable medium storing one or more instructions executable by a computer system to perform one or more operations for expanding a distributed graph database, the operations comprising:

in response to reception of graph data migration information, entering a data copy-only mode that disables a capability of a second data storage node to provide a read/write service to a client device;

initiating, in the data copy-only mode, and based on the graph data migration information, graph data migration from a first data storage node that stores a first graph data shard to be migrated, to obtain a data snapshot of the first graph data shard without processing any graph data read or write requests received from the client device, wherein the graph data migration information comprises a shard identifier of the first graph data shard and a node identifier of the first data storage node, wherein initiating the graph data migration comprises sending a graph data migration request comprising the shard identifier to the first data storage node corresponding to the node identifier, and wherein the data snapshot comprises data content and a data point of the first graph data shard at a time of starting the graph data migration;

in response to completion of the graph data migration, entering a data storage service mode that enables the capability of the second data storage node to provide the read/write service to the client device, and sending a graph data shard deletion notification to the first data storage node, wherein the graph data shard deletion notification is used to instruct the first data storage node to delete the first graph data shard; and performing, in the data storage service mode, data synchronization with a corresponding first graph data shard of a primary replica based on the data point in the data snapshot, comprising:

forwarding the data point in the data snapshot to the first data storage node that comprises the corresponding first graph data shard of the primary replica, to determine a data point difference relative to the data point of the stored first graph data shard; and initiating a data write operation for the second data storage node based on the data point difference by using the first data storage node that comprises the corresponding first graph data shard, and performing data synchronization with the corresponding first graph data shard of the primary replica.

7. The non-transitory, computer-readable medium of claim 6, wherein:

the graph data migration information is determined by a graph data analysis layer in response to a replica expansion request, based on replica metadata of a replica to be expanded and node storage status information of a data storage node in a corresponding data storage node cluster;

the replica metadata comprises graph topology structure information of the corresponding data storage node cluster, the graph topology structure information comprising a total count of replicas that have been generated in the distributed graph database, a data storage node on which each replica is stored, and a graph data shard stored on each data storage node; and the node storage status information comprises an available storage capacity and a node working mode of the data storage node.

8. The non-transitory, computer-readable medium of claim 7, wherein the replica metadata comprises a shard size of a stored graph data shard, and the graph data migration information is determined by the graph data analysis layer based on the replica metadata of the replica to be expanded and the node storage status information of the data storage node in the corresponding data storage node cluster by using a load balancing strategy.

9. The non-transitory, computer-readable medium of claim 8, wherein the node storage status information of the data storage node is comprised in the replica metadata.

10. The non-transitory, computer-readable medium of claim 6, wherein during replica expansion, the first data storage node is always in the data storage service mode.

11. A computer-implemented system for expanding a distributed graph database, the system comprising:

one or more computers; and one or more computer memory devices interoperably coupled with the one or more computers and having tangible, non-transitory, machine-readable media storing one or more instructions that, when executed by the one or more computers, perform one or more operations, comprising:

in response to reception of graph data migration information, entering a data copy-only mode that disables a capability of a second data storage node to provide a read/write service to a client device;

initiating, in the data copy-only mode, and based on the graph data migration information, graph data migration from a first data storage node that stores a first graph data shard to be migrated, to obtain a data snapshot of the first graph data shard without processing any graph data read or write requests received from the client device, wherein the graph data migration information comprises a shard identifier of the first graph data shard and a node identifier of the first data storage node, wherein initiating the graph data migration comprises sending a graph data migration request comprising the shard identifier to the first data storage node corresponding to the node identifier, and wherein the data snapshot comprises data content and a data point of the first graph data shard at a time of starting the graph data migration;

in response to completion of the graph data migration, entering a data storage service mode that enables the capability of the second data storage node to provide the read/write service to the client device, and sending a graph data shard deletion notification to the first data storage node, wherein the graph data shard deletion notification is used to instruct the first data storage node to delete the first graph data shard; and performing, in the data storage service mode, data synchronization with a corresponding first graph data shard of a primary replica based on the data point in the data snapshot, comprising:

forwarding the data point in the data snapshot to the first data storage node that comprises the corresponding first graph data shard of the primary replica, to determine a data point difference relative to the data point of the stored first graph data shard; and initiating a data write operation for the second data storage node based on the data point difference by using the first data storage node that comprises the corresponding first graph data shard, and performing data synchronization with the corresponding first graph data shard of the primary replica.

12. The computer-implemented system of claim 11, wherein:

the graph data migration information is determined by a graph data analysis layer in response to a replica expansion request, based on replica metadata of a replica to be expanded and node storage status information of a data storage node in a corresponding data storage node cluster;

the replica metadata comprises graph topology structure information of the corresponding data storage node cluster, the graph topology structure information comprising a total count of replicas that have been generated in the distributed graph database, a data storage node on which each replica is stored, and a graph data shard stored on each data storage node; and the node storage status information comprises an available storage capacity and a node working mode of the data storage node.

13. The computer-implemented system of claim 12, wherein the replica metadata comprises a shard size of a stored graph data shard, and the graph data migration information is determined by the graph data analysis layer based on the replica metadata of the replica to be expanded and the node storage status information of the data storage node in the corresponding data storage node cluster by using a load balancing strategy.

14. The computer-implemented system of claim 13, wherein the node storage status information of the data storage node is comprised in the replica metadata.

* * * * *